US010846348B2

(12) United States Patent
Locatelli et al.

(10) Patent No.: US 10,846,348 B2
(45) Date of Patent: Nov. 24, 2020

(54) COMPUTERIZED SYSTEM FOR MANAGING THE OPERATION OF AN ELECTRIC POWER DISTRIBUTION GRID WITH A CONFIGURABLE ACCESSORY DEVICE

(71) Applicant: ABB S.p.A., Milan (IT)

(72) Inventors: Emilio Battista Locatelli, San Pellegrino Terme (IT); Simone Micheli, Zogno (IT)

(73) Assignee: ABB S.p.A., Milan (IT)

( * ) Notice: Subject to any disclaimer, the term of this patent is extended or adjusted under 35 U.S.C. 154(b) by 147 days.

(21) Appl. No.: 15/844,314

(22) Filed: Dec. 15, 2017

(65) Prior Publication Data

US 2018/0173176 A1    Jun. 21, 2018

(30) Foreign Application Priority Data

Dec. 15, 2016 (EP) .................................. 16204505

(51) Int. Cl.
*G06F 13/00* (2006.01)
*G06F 16/951* (2019.01)
(Continued)

(52) U.S. Cl.
CPC .......... *G06F 16/951* (2019.01); *G06F 3/0488* (2013.01); *G06F 3/04842* (2013.01);
(Continued)

(58) Field of Classification Search
CPC ...... G06F 13/00; G06F 3/0484; G06F 3/0488; G06F 3/04842; G06F 16/951;
(Continued)

(56) References Cited

U.S. PATENT DOCUMENTS 8,374,729 B2    2/2013  Chapel et al.
2013/0245842 A1*  9/2013  Lu .................. H04L 12/2807
                                                   700/286

(Continued)

FOREIGN PATENT DOCUMENTS

EP    1113556 A1    7/2001
EP    3232534 A1    10/2017

OTHER PUBLICATIONS

European Patent Office, Extended Search Report issued in corresponding Application No. 16204505.8, dated Feb. 15, 2017, 10 pp.

*Primary Examiner* — Robert B Harrell
(74) *Attorney, Agent, or Firm* — Taft Stettinius & Hollister LLP; J. Bruce Schelkopf

(57) ABSTRACT

A computerized system for managing the operation of an electric power distribution grid wherein it includes: at least an accessory device operatively coupled with or comprised in an electronic protection relay of the electric power distribution grid, wherein the accessory device is configured to gather grid data, which are related to the operation of the electric power distribution grid, from one or more electronic devices of the electronic protection relay or operatively connected with the electronic protection relay, which are in communication with the accessory device, wherein the accessory device is configured to transmit the grid data through the Internet; a computerised platform capable of communicating and interact with the at least an accessory device through the Internet; and a configuration computerized unit capable of communicating with the accessory device and the managing platform through the Internet, the configuration computerized unit being adapted to execute a configuration method of the at least an accessory device.

13 Claims, 15 Drawing Sheets

(51) Int. Cl.
  *G06Q 50/06* (2012.01)
  *H02J 13/00* (2006.01)
  *H04Q 9/00* (2006.01)
  *G06F 3/0484* (2013.01)
  *G06F 3/0488* (2013.01)

(52) U.S. Cl.
  CPC ........ *G06Q 50/06* (2013.01); *H02J 13/00001* (2020.01); *H02J 13/0079* (2013.01); *H04Q 9/00* (2013.01); *H04Q 2209/60* (2013.01); *Y02E 60/7869* (2013.01); *Y04S 10/40* (2013.01); *Y04S 40/128* (2013.01)

(58) Field of Classification Search
  CPC ... G06F 17/30; G06F 17/30864; H04L 29/06; H04L 29/08072; H04L 29/08981; H04L 41/12; H04L 41/0806; G05B 15/02; G06Q 50/06; H02J 13/00; H02J 13/001; H02J 13/0079; H04Q 9/00; H04Q 2209/60; Y02E 60/7869; Y04S 10/40; Y04S 40/128
  USPC .......................................................... 709/220
  See application file for complete search history.

(56) References Cited

U.S. PATENT DOCUMENTS

| | | | |
|---|---|---|---|
| 2014/0025321 A1* | 1/2014 | Spanier | G01R 21/133 |
| | | | 702/62 |
| 2015/0073613 A1 | 3/2015 | Li et al. | |
| 2015/0172124 A1 | 6/2015 | Piccinini et al. | |
| 2015/0286394 A1* | 10/2015 | Koval | H04L 67/06 |
| | | | 713/156 |
| 2016/0036633 A1* | 2/2016 | Lee | H04L 41/085 |
| | | | 709/221 |

* cited by examiner

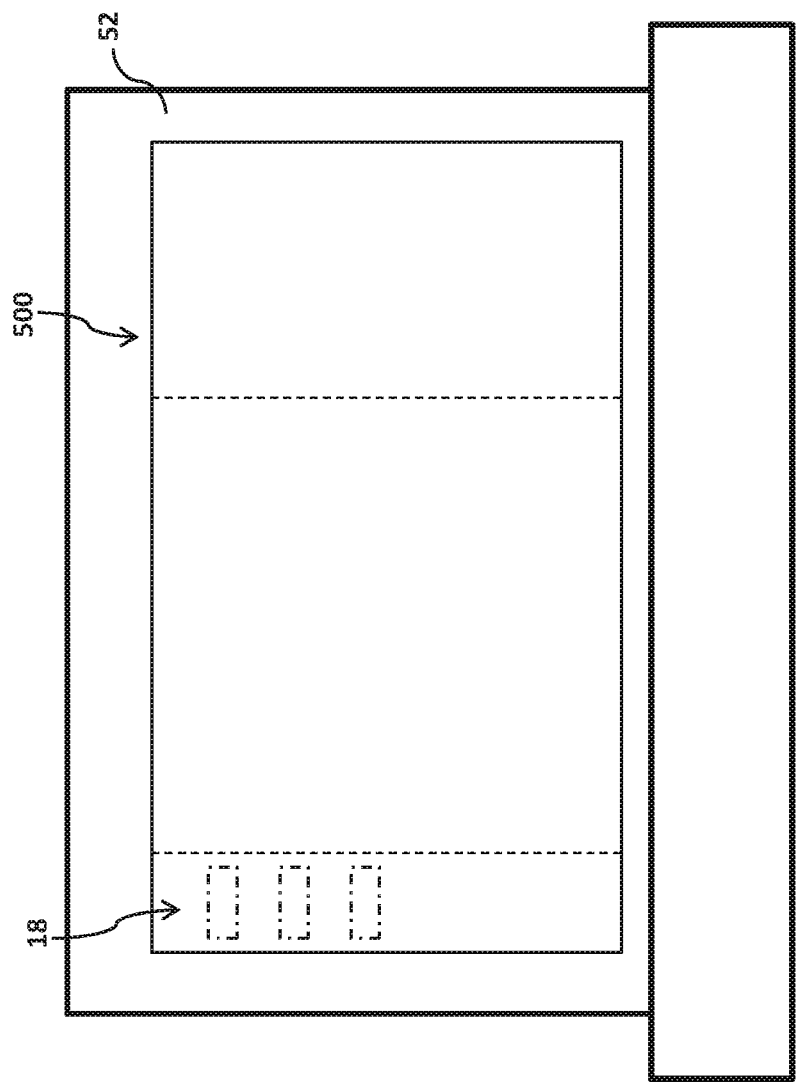

US 10,846,348 B2

COMPUTERIZED SYSTEM FOR MANAGING THE OPERATION OF AN ELECTRIC POWER DISTRIBUTION GRID WITH A CONFIGURABLE ACCESSORY DEVICE

The present invention relates to the field of electric power distribution grids.

More particularly, the present invention relates to a computerised system for remotely managing the operation of an electric power distribution grid, which preferably operates at low voltage level.

In a further aspect, the present invention relates to configuration method implemented in said computerised system.

For the purposes of the present application, the term "low voltage" (LV) relates to operating voltages lower than 1 kV AC and 1.5 kV DC.

As is known, low voltage switchgear installations comprise switching devices (e.g. circuit breakers, disconnectors, contactors, and the like) designed to enable specific sections of an electric power distribution grid to properly operate.

Typically, the above-described switching devices are operatively associated with electronic protection and control devices (also known as "protection relays"), which are adapted to check the operating conditions of the switchgear by means of suitable sensors and generate suitable commands to prompt the intervention of associated switching devices in the event of failures or overloads.

In addition to serving the above-mentioned protection and control purposes, protection relays can collect and provide data sets related to the operating status of the switchgear or other portions of the electric power distribution grid, in which they are installed.

Currently available arrangements for managing the operating status of an electric power distribution grid are complex and expensive and do not actually allow a full exploitation of the data collected by the protection relays to provide advanced monitoring services to the customer. In order to solve the above-mentioned drawbacks, computerised systems for remotely managing the operating status of an electric power distribution grid have been recently proposed.

An example of these computerised systems is described in the patent application EP16165254 in the name of the same applicant.

However, even if they provide relevant advantages, such computerised systems should still be improved to make them configurable in a simpler way by the user.

In order to respond to this need, the present invention provides to a computerised system for managing the operation of an electric power distribution grid, according to the following claim 1 and the related dependent claims.

In further aspect, the present invention relates to a configuration method according to claim 12 and the related dependent claims Characteristics and advantages of the present invention will emerge more clearly from the description of preferred, but not exclusive embodiments of the computerised system, according to the invention, of which non-limiting examples are shown in the attached drawings, wherein:

FIGS. 4-14 are schematic views showing a configuration method implemented by a configuration computerized unit included in the computerised system, according to the invention.

Figure 1:
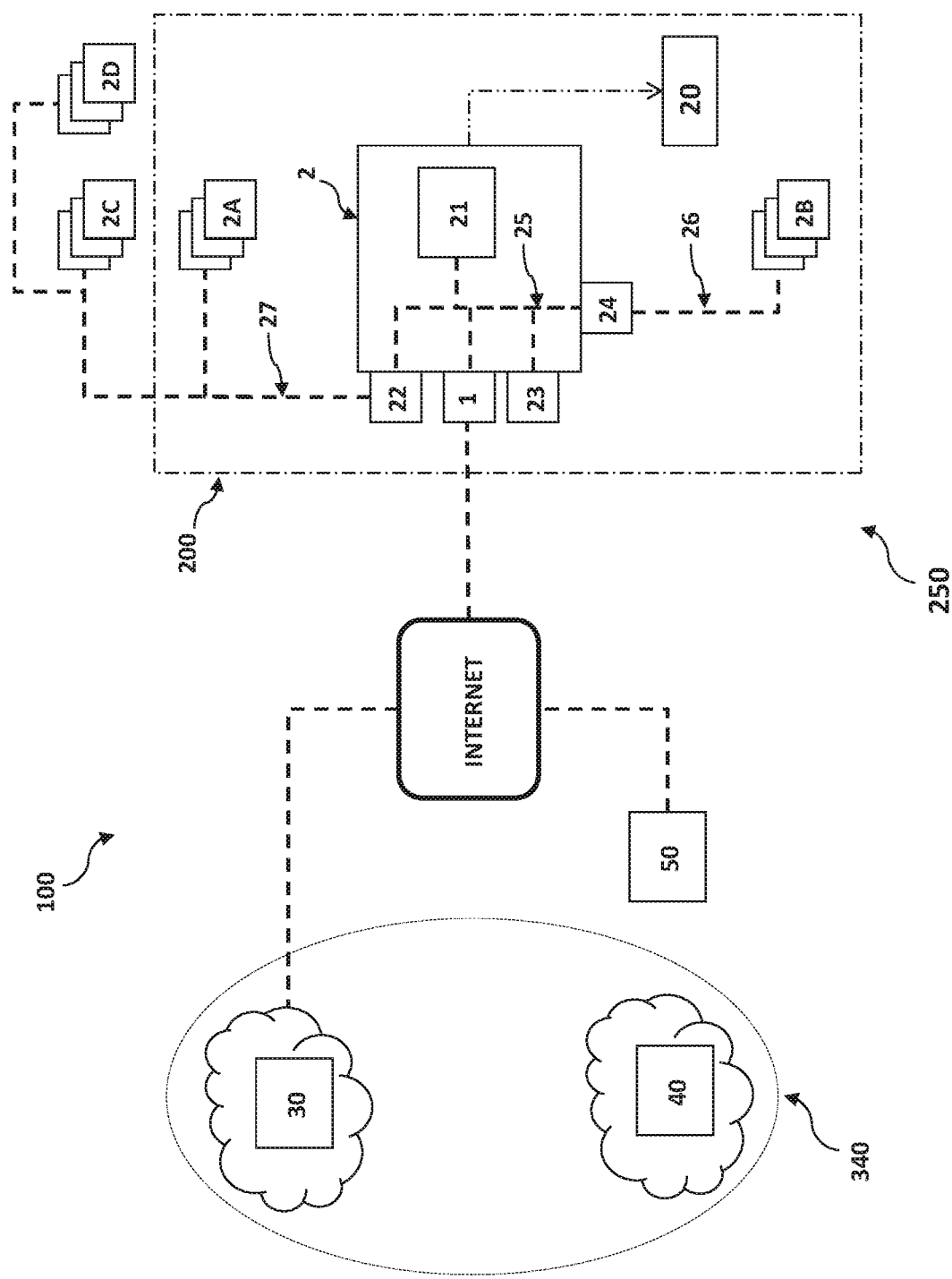
FIGS. 1-2, 3A are schematic views showing the computerized system, according to the invention.

With reference to the above-mentioned figures, the present invention refers to a computerized system 100 for remotely managing the operation of an electric power distribution grid 250, which preferably operates at low voltage level.

The electric power distribution grid 250 comprises one or more protection relays 2.

Each protection relay 2 may be operatively associated with a switching device 20 (e.g. a circuit breaker, disconnector, contactor, or the like) of the electric power distribution grid 250.

Figure 3:
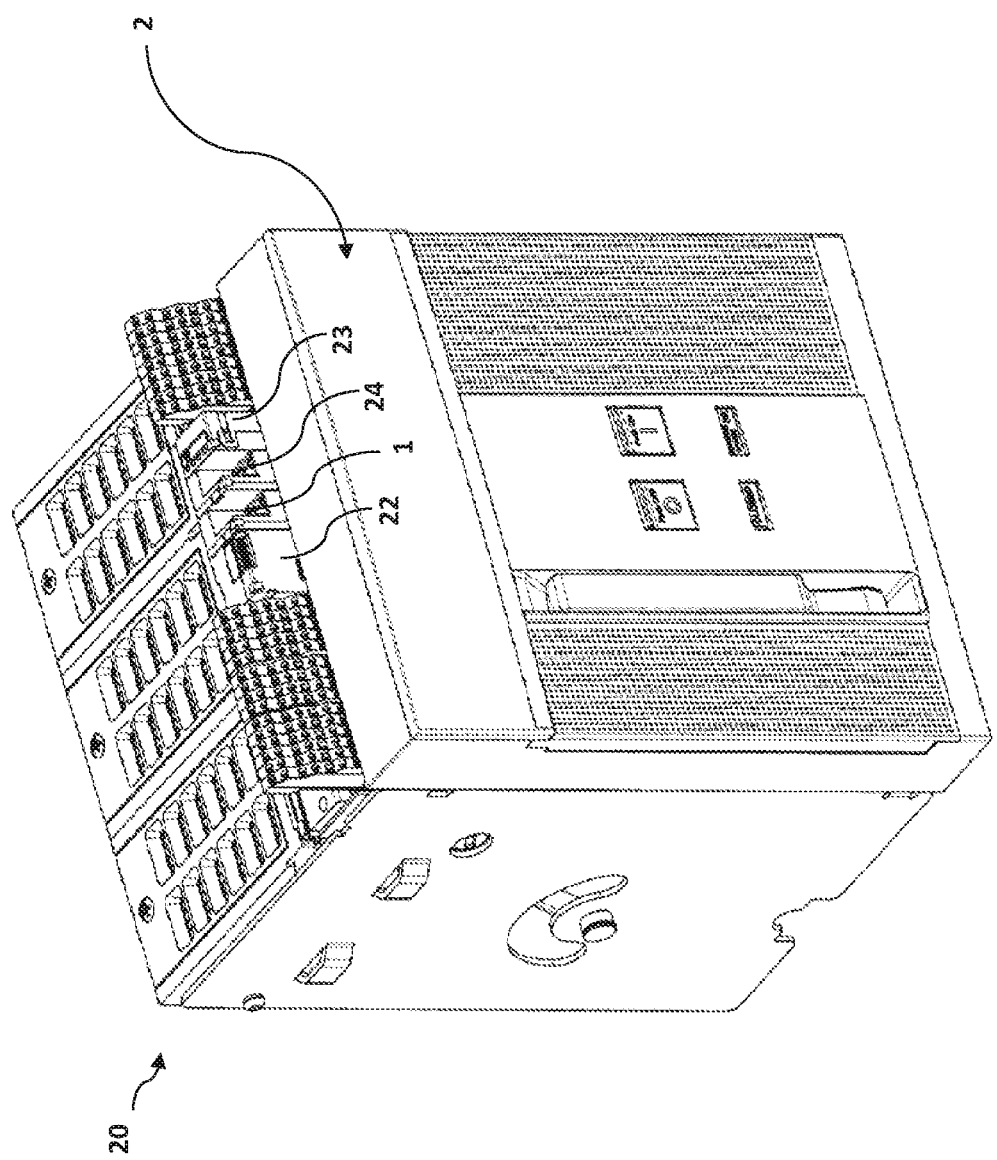
FIG. 3 is a schematic view showing an accessory device included in the computerized system, according to the invention operatively coupled to a LV switching device.

For example, a protection relay 2 may be mounted together with the associated switching device 20 (as shown in FIG. 3).

The electronic protection relays 2 and, possibly, the associated switching devices 20 are preferably included in a switchgear 200 of the electric power distribution grid 250.

The switchgear 200 may include further electrical switching devices (not shown) and further protection relays 2A, 2B.

The electric power distribution grid 250 may include further electrical switching devices (not shown), further electronic protection devices 2C outside the switchgear 200 or other generic electronic devices 2D (e.g. temperature or moisture sensors, water or gas meters, and the like) outside the switchgear 200.

Obviously, the electric power distribution grid 250 and the switchgear 200 may include electronic devices of different types from those mentioned above.

Preferably, each electronic protection relay 2 comprises a protection and control unit 21, which may be of known type.

The control unit 21 is configured to acquire data related to the operating conditions of the electric power distribution grid 250, check the operating conditions of this latter and provide suitable commands to prompt the intervention of the associated switching device 20 in the event of anomalous conditions, e.g. faults or overloads.

Preferably, the protection relay 2 comprises or is operatively coupled with one or more further accessory devices 22, 23, 24, which may be of known type.

The accessory devices 22, 23, 24 may include, for example, electronic devices designed to potentiate/expand the functions of the protection and control unit 21 (e.g. the accessory device 23), electronic devices configured to provide an interface towards external communication buses (e.g. the accessory devices 22, 24), electronic devices intended to provide auxiliary interfaces for the protection and control unit 21 (such as a display or a LED interface), and the like.

Preferably, the protection relay 2 comprises a first communication bus 25 (here also referred to as "local bus") designed to provide a communication channel between the protection and control unit 21 and other electronic devices 22, 23, 24 of the electronic protection relay 2. Preferably, the local bus 25 implements a communication protocol of the FIELDBUS type, such as CAN or ETHERNET, using communication modalities of the "multi-master" type. Preferably, the protection relay 2 can communicate with further several electronic protection devices 2A, 2C located inside or outside the switchboard 200 through a second communication bus 27 (here also referred to as "system bus") of the electric power distribution grid 250, which is designed to provide a communication channel between the protection and control unit 21 and further electronic protection relays.

Preferably, the system bus 27 implements a communication protocol of the MODBUS, PROFIBUS, PROFINET or MODBUS-TCP type, using communication modalities of the "master-slave" type.

Preferably, the protection relay 2 can communicate with further several electronic protection devices 2B of the switchgear 200 through a third communication bus 26 (here also referred to as "switchboard bus") of this latter, which is designed to provide a dedicated communication channel between the protection and control unit 21 and further electronic protection relays of the switchgear 200.

Preferably, the switchboard bus 26 implements a communication protocol of the FIELDBUS type, such as CAN or ETHERNET, using communication modalities of the "multi-master" type.

According to the invention, the computerized system 100 comprises at least an accessory device 1 operatively coupled with or comprised in a corresponding electronic protection relay 2 of the electric power distribution grid 250.

In some embodiments (FIGS. 3-4), the accessory device 1 is adapted to be removably mounted together with the corresponding electronic protection relay 2 on the switching device 20.

However, other solutions are possible depending on how the electronic protection relay 2 is realized.

As an example (not shown), the accessory device 1 may be removably mounted on the external case of the electronic protection relay 2, when this latter is a self-standing unit.

As a further example (not shown), the accessory device 1 may be an internal electronic module integrated within the electronic protection relay 2.

According to the embodiment shown in FIG. 3, the accessory device 1 comprises an outer housing 14, preferably of insulating material.

Preferably, the accessory device 1 is mountable on the switching device 20 and connectable with the components of the protection relay 2.

The accessory device 1 is configured to gather grid data D, which are related to the operation of the electric power distribution grid 250, and transmit said grid data through the Internet.

The grid data D may comprise information related to the operation of the electric power distribution grid 250, e.g. data related to measured electrical quantities, setting parameters, control variables, and the like, which may concern any devices or components included in the electric power distribution grid 250.

The accessory device 1 is configured to gather the grid data D from one or more electronic devices 21, 22, 23, 24, 2A, 2B, 2C, 2D of said electric power distribution grid, which are in communication with said accessory device.

Preferably, the accessory device 1 comprises at least a first communication port 1A suitable for communication with electronic devices included in or operatively connected with the electronic protection relay 2, e.g. the protection and control unit 21, the accessory devices 22, 23, 24 or the electronic protection relays 2A, 2B, 2C.

Information may be transmitted through the local bus 25 and possibly through the switchboard bus 26 and the system bus 27 (using in this case the accessory devices 22, 24 as gateways). As an example, the communication port 1A may be a CAN or ETHERNET port.

Preferably, the accessory device 1 comprises at least a second communication port 1B suitable for communication with one or more remote computerized units 30, 40, 50 through the Internet. Information may be transmitted through an Internet line channel by means of a suitable communication cable (e.g. of the ETHERNET type) or a suitable antenna arrangement (e.g. of the Wi-Fi type).

As an example, the communication port 1B may be a TCP or UDP port protocol suitable for an Internet protocol suite.

Preferably, the accessory device 1 comprises first processing means 1C configured to manage its operation.

As an example, the processing means 1C may comprise one or more processing devices, e.g. microprocessors, one or more memories operatively coupled to said processing devices and a software stored in said memories and executable by said processing devices.

The first processing means 1C, in particular the processing devices thereof, are operatively coupled with the first and second communication ports 1A, 1B.

In general, the accessory device 1 can communicate with the protection and control unit 21, with one or more further accessory devices 22, 23, 24 of the electronic protection relay 2 (through the local bus 25), with one or more further electronic devices 2A, 2B, 2C, 2D in communication with the electronic protection relay 2 (through the communication buses 25, 26, 27 and the accessory devices 22, 24) and with one or more remote computerized units 30, 40, 50 (through the Internet).

Figure 2:
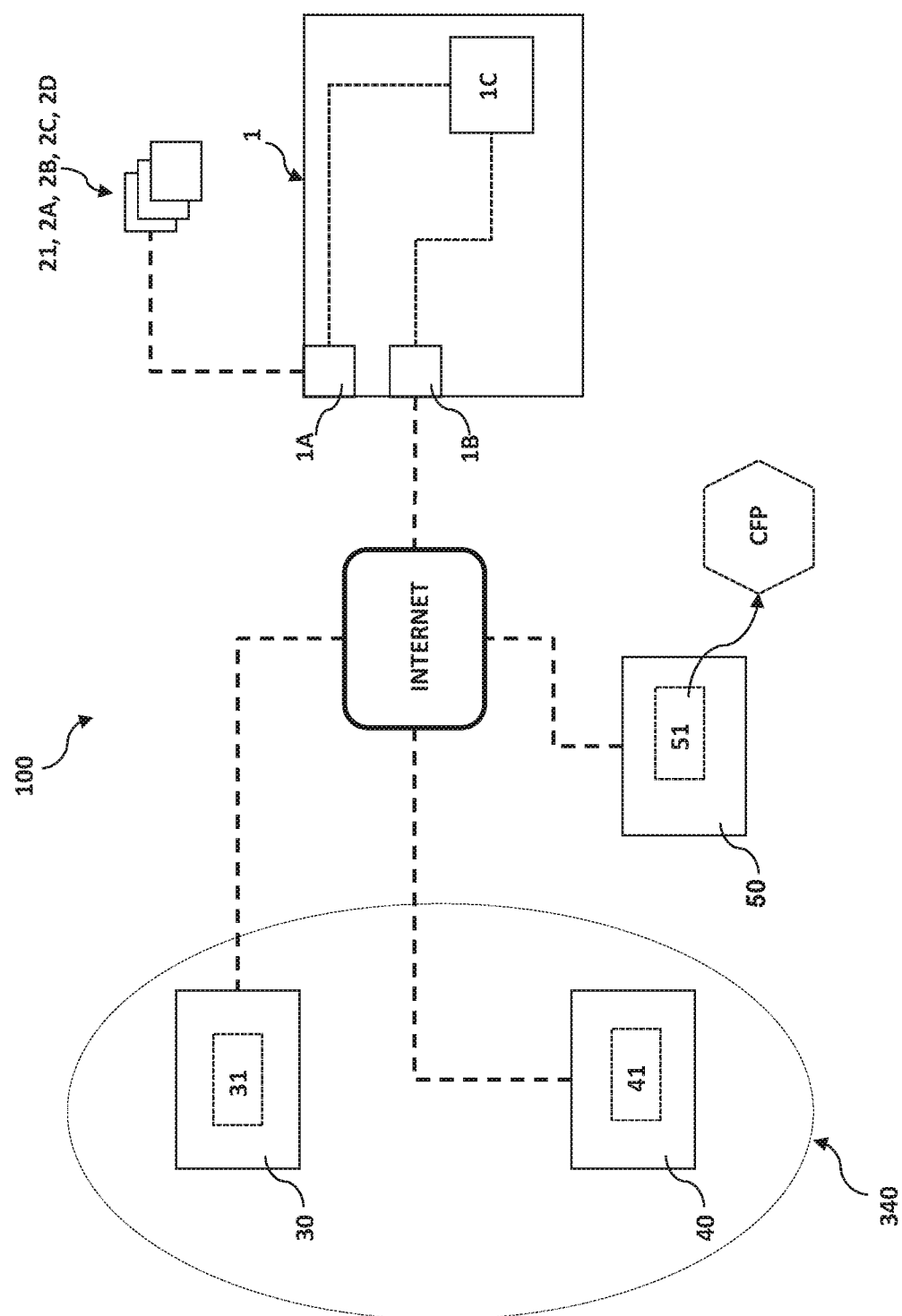

In the exemplificative embodiment shown in FIGS. 2-3, the accessory device 1 does not collect data directly from the accessory module 23 but it collects data related to the accessory device 23 from the protection and control unit 21, which is in communication with this latter through the local bus 25.

In the exemplificative embodiment shown in FIGS. 2-3, the accessory device 1 collects data from the electronic devices 2A, 2B, 2C, 2D through the communication buses 25, 26, 27 and the accessory devices 22, 24. These latter preferably operate as communication interfaces and are therefore functionally transparent to the accessory device 1.

Of course, other configurations of the data flow to/from the accessory device 1 are possible according to the needs.

Figure 3A:
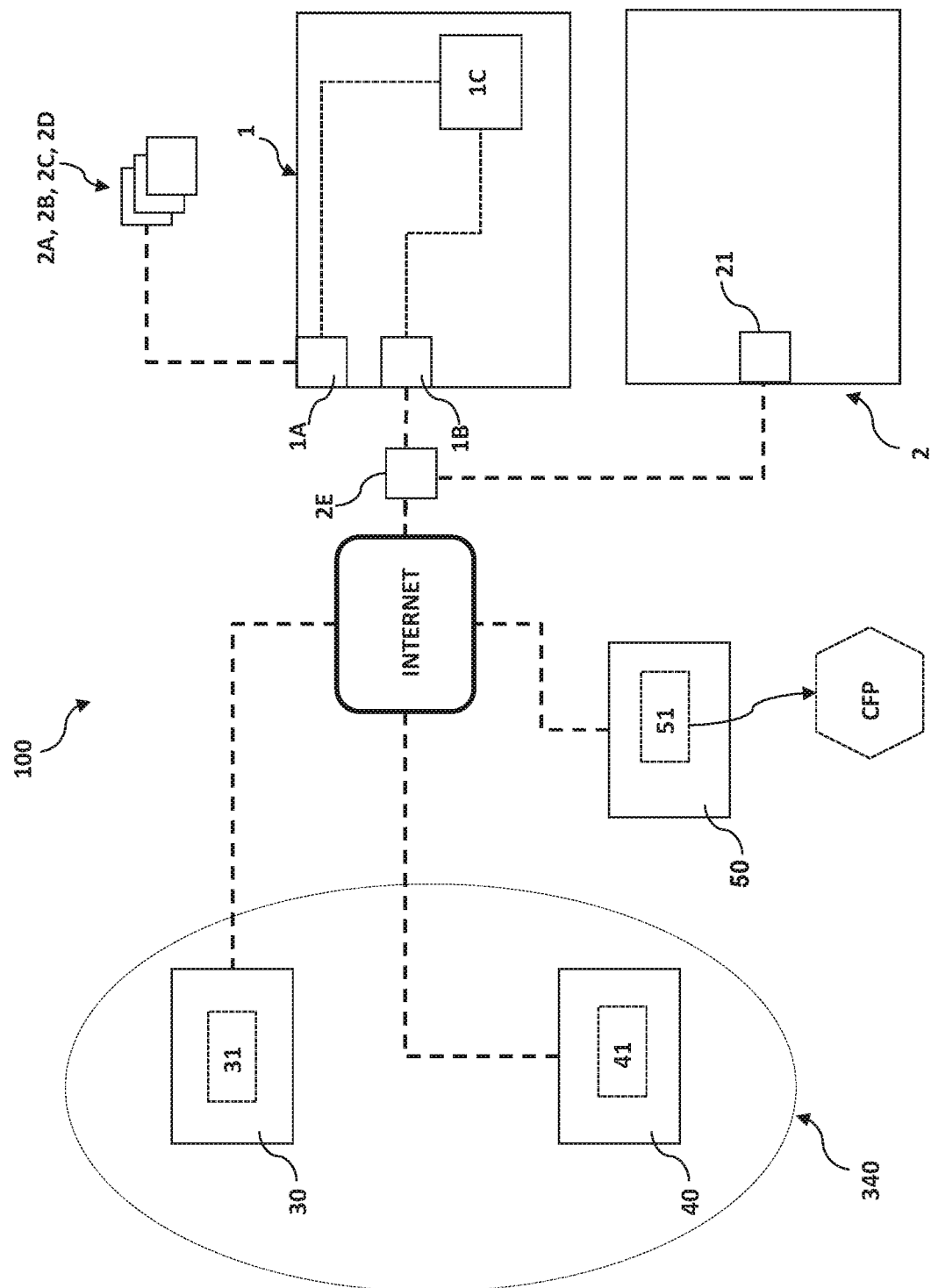

According to another embodiment, which is shown in FIG. 3A, the electronic devices 2A, 2B, 2C, 2D may be in communication with the communication port 1A of the accessory device 1 whereas the protection and control unit 21 of the electronic protection relay 2, which is operatively associated to the accessory device 1, may be in communication with the communication port 1B of the accessory device 1 (e.g. through a suitable communication switch 2E).

In any case, it is important to notice that the accessory device 1 is capable of providing the electronic protection relay 2, to which it is operatively associated, with a direct connection to the Internet without the need of using or arranging dedicated communication buses (such as e.g. the system bus 27).

In practice, the accessory device 1 can operate as an Internet gateway, which is capable of collecting the grid data D at level of the electric power distribution grid 250 and to transmit said grid data through the Internet, so that said grid data can be processed at a remote level (e.g. at a cloud computing level).

According to the invention, the computerized system 100 comprises a computerised platform 340 capable of communicating and interacting with the accessory device 1 through the Internet. Preferably, the computerised platform 340 comprises at least a publishing computerised unit 30 capable of communicating with the accessory device 1 through the Internet.

The publishing computerised unit 30 is configured to interact with the accessory device 1 to acquire and store the grid data D.

Preferably, the publishing computerised unit 30 comprises second processing means 31 configured to manage its operation.

As an example, the processing means 31 may comprise one or more processing devices, e.g. microprocessors, one or more memories operatively coupled to said processing devices and a software stored in said memories and executable by said processing devices.

The publishing computerized unit 30 may consist of a single computerized unit or of several computerized units connectable to the Internet and interacting one with another, for example to implement a cloud computing architecture.

As an example, the publishing computerized unit 30 may be a computer unit provided with an operating system for devices with "server" type functionalities, for example Windows Server™, Windows Azure™, Mac OS Server™ or the like.

Preferably, the computerised platform 340 comprises also an interface computerized unit 40 capable of communicating with the accessory device 1 and the publishing computerised unit 30 through the Internet.

The interface computerized unit 40 is configured to provide interface services to manage the interaction of the accessory device 1 with the publishing computerised unit 30.

The basic task of the interface computerized unit 40 consists in facilitating the interaction between the accessory device 1 and the publishing computerised unit 30, e.g. by fitting, in very flexible way, the operation of the accessory device 1 with possible configuration changes of the publishing computerised unit 30.

As an example, the interface computerised unit 40 may be configured to provide format translation services to the publishing computerised unit 30 and/or to the accessory device 1 so that the accessory device 1 can transmit data with a same transmission format without the need of updating its firmware in case of changes in the publishing computerised unit.

Preferably, the interface computerised unit 40 comprises third processing means 41 configured to manage its operation.

As an example, the processing means 41 may comprise one or more processing devices, e.g. microprocessors, one or more memories operatively coupled to said processing devices and a software stored in said memories and executable by said processing devices.

The interface computerized unit 40 may consist of a single computerized unit or several computerized units connectable to the Internet and interacting one with another, for example to implement a cloud computing architecture.

As an example, the interface computerized unit 40 may be a computer unit provided with an operating system for devices with "server" type functionalities, for example Windows Server', Windows Azure™, Mac OS Server™ or the like.

Preferably, the accessory device 1 is configured to execute data-gathering tasks, in which the accessory device 1 polls one or more electronic devices 21, 2A, 2B, 2C, 2D, which are in communication with said accessory device and receives grid data D from said electronic devices in response to such polling activity.

Preferably, said data-gathering tasks are executed by the accessory device 1 basing on information included in a data-gathering file DGF stored therein, e.g. in a permanent memory location of the processing means 1C.

The data-gathering file DGF advantageously includes information allowing the accessory device 1 to correctly interact with the electronic devices 21, 2A, 2B, 2C, 2D of interest and correctly acquire and store the grid data D.

As an example, the data-gathering file DGF may comprise information on the electronic devices 21, 2A, 2B, 2C, 2D to be polled, on the communication addresses of said electronic devices, on the communication buses 25, 26, 27 to communicate with said electronic devices, on the type of grid data D to gather, and the like.

Advantageously, the accessory device 1 is configured to operate as a "master" device during the data-gathering tasks, i.e. it can take the initiative for communicating with a slave device of interest (e.g. one of the electronic devices 21, 2A, 2B, 2C, 2D) at any time, obviously in accordance with the timing information stored in the data-gathering file DGF.

By acting as a master device, the accessory device 1 can optimize the execution of data-gathering tasks from many points of view, e.g. by oversampling data when possible or by properly tuning the data-gathering strategy in relation to the kind of data to be collected (e.g. measurement data require a continuous update whereas configuration data can be sampled less frequently as they seldom change).

Preferably, the accessory device 1 is configured to execute data-publishing tasks, in which the accessory device 1 transmits the stored grid data D to the computerised platform 340, in particular to the remote publishing computerized unit 30, which is in communication with said accessory device through the second communication port 1B of this latter (in other words through the Internet).

Preferably, the accessory device 1 is configured to execute the mentioned data-publishing tasks basing on information included in the data-gathering file DGF and in a stored data-publishing file DPF, which may be memorized in a permanent memory location of the processing means 1C.

The data-publishing file DPF advantageously includes information to allow the accessory device 1 to correctly interact with the computerized publishing unit 30 through the Internet and correctly transmit the grid data D to this latter.

As an example, the data-publishing file DPF may comprise information on the communication addresses of the computerized unit 30, information on digital certificates to safely interact with the publishing computerized unit 30, and the like.

Advantageously, the accessory device 1 is configured to operate as a "client" device during the data-publishing tasks, i.e. it can take the initiative for communicating with the publishing computerised unit 30 only when requested or in accordance with the timing information stored in the data-gathering file DGF.

This allows reducing vulnerability of the Internet connection of the accessory device 1.

According to an aspect of the invention, the computerised platform 100 comprises at least a configuration computerized unit 50, which is capable of communicating with the accessory device 1 through the Internet.

As it will be evident from the following, the configuration computerized unit 50 is also capable of communicating with the computerised platform 340 through the Internet.

The configuration computerized unit 50 is adapted to manage the operative configuration of the accessory device 1, more particularly to implement a configuration method CFP to configure the accessory device 1.

As known to those skilled in the art, "configuring" an electronic device (in this case the accessory device 1) consists in setting-up a set of operating parameters used by said electronic device to exploit its functionalities. Said operating parameters may consist in suitable numeric or logic values (configuration values) that can be stored and processed by the electronic device itself.

The computerized unit 50 may comprise fourth processing means 51 configured to manage its operation.

As an example, the processing means 51 may comprise one or more processing devices, e.g. microprocessors, one or more memories operatively coupled to said processing devices and a software stored in said memories and executable by said processing devices.

The computerized unit 50 may consist of a single computerized unit or of several computerized units connectable to the Internet and interacting one with another, for example to implement a cloud computing architecture.

As an example, the configuration computerized unit 50 may be a laptop computer, a tablet, a smartphone or the like.

The computerized unit 50 is provided with a processing unit 51 (e.g. including one or more microprocessors) that is capable of executing software instructions to implement said configuration method CFP.

The computerized unit 50 comprises a storage memory in which said software instructions are permanently saved.

As an alternative, the computerised unit 50 may be operatively associated with another memory support from which said software instructions may uploaded for execution by the processing unit 51.

The computerized unit 50 comprises or it is operatively associated to a display 52 that is driven by the processing unit 51.

Conveniently, the computerized unit 50 has Internet communication capabilities to communicate with the accessory device 1 and the computerised platform 340.

To this aim, the computerized unit 50 is equipped with one or more communication ports driven by the processing unit 51.

In a step of the configuration method CFP, the computerised unit 50 provides a graphic user interface 500 on the computer display 52 (FIG. 4).

The graphic user interface (GUI) 500 is a visual graphic environment comprising visual graphic resources 190, 11, 12, 13, 14, 15, 16, 17, 18 (e.g. graphic icons, graphic windows, graphic cursors, visual indicators, visual menus, and the like) to assist a user in configuring the accessory device 1 by means of the computerised unit 50.

In general, the graphic resources 190, 11, 12, 13, 14, 15, 16, 17, 18 are made available to assist a user providing in input to the computerised unit 50 specific commands or information to make this latter to execute corresponding actions to configure the accessory device 1.

Conveniently, the graphic resources 190, 11, 12, 13, 14, 15, 16, 17, 18 are activatable in accordance to known activation modes normally adopted in computerised units, e.g. by clicking on said graphic resources through a mouse pointer (e.g. when the display 52 is a computer monitor or a lap-top display) or by touching corresponding interactive regions of the display 52 (e.g. when the display 52 is a touch-screen display).

Information can be input by a user in accordance to known input modes normally adopted in computerised units, e.g. by typing or activating dedicated graphic objects (graphic cursors, graphic icons, and the like).

Preferably, the GUI 500 comprises one or more configuration pages, at which the graphic resources 190, 11, 12, 13, 14, 15, 16, 17 are made available.

Preferably, the GUI 500 comprises auxiliary graphic resources 18 (e.g. graphic buttons or bars) on each configuration page to allow a user to navigate through different configuration pages or to save or to upload said configuration pages on/from the storage memory 53.

Preferably, the computerised unit 50 provides initially on the GUI 500 a login configuration page 190 to assist a user in providing login information (e.g. data related to the identity of the user).

Figure 5:
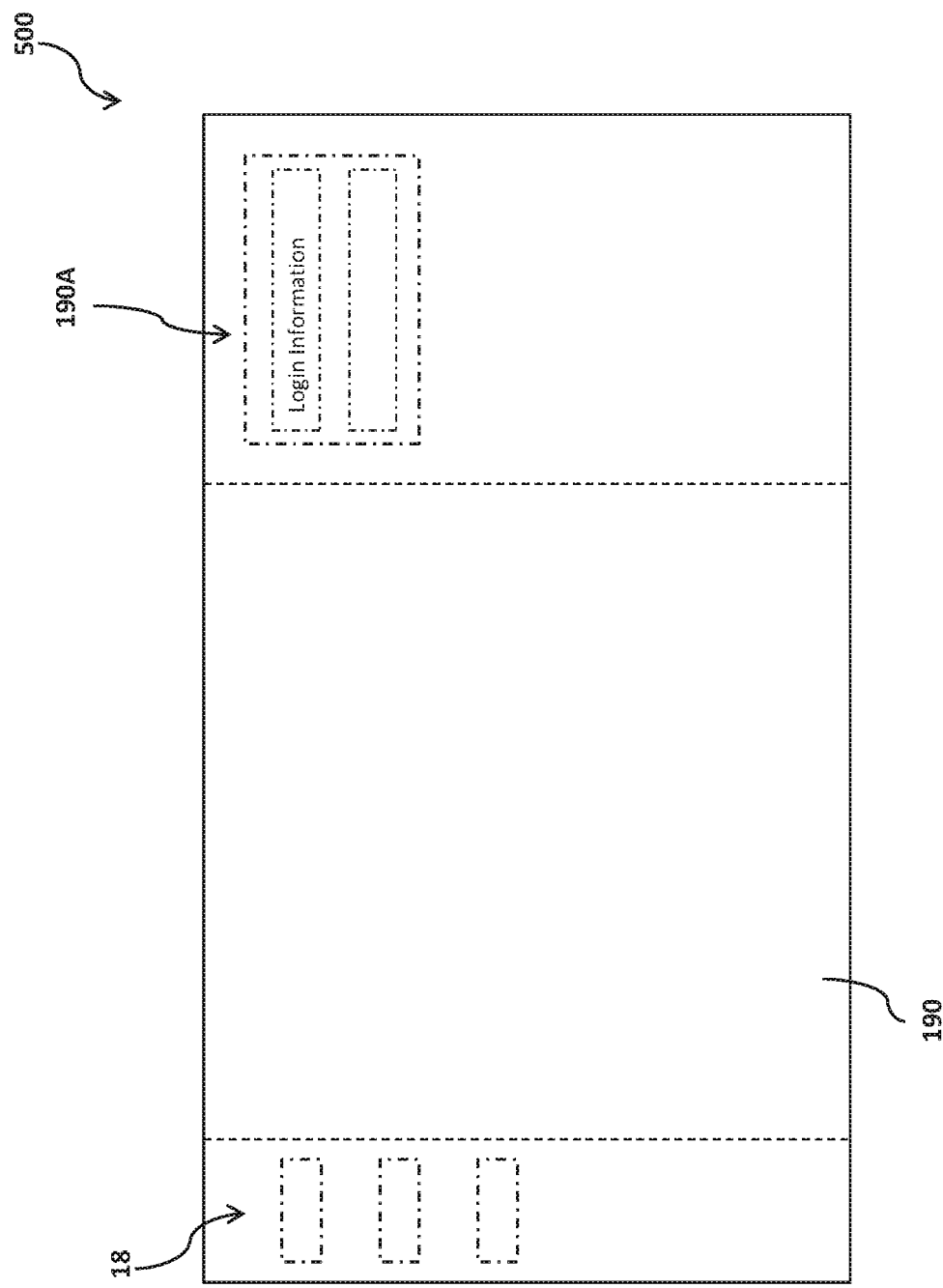

Preferably, the configuration page 190 comprises one or more graphic objects 190A (e.g. a graphic mask) to insert said login information (FIG. 5).

Figure 6:
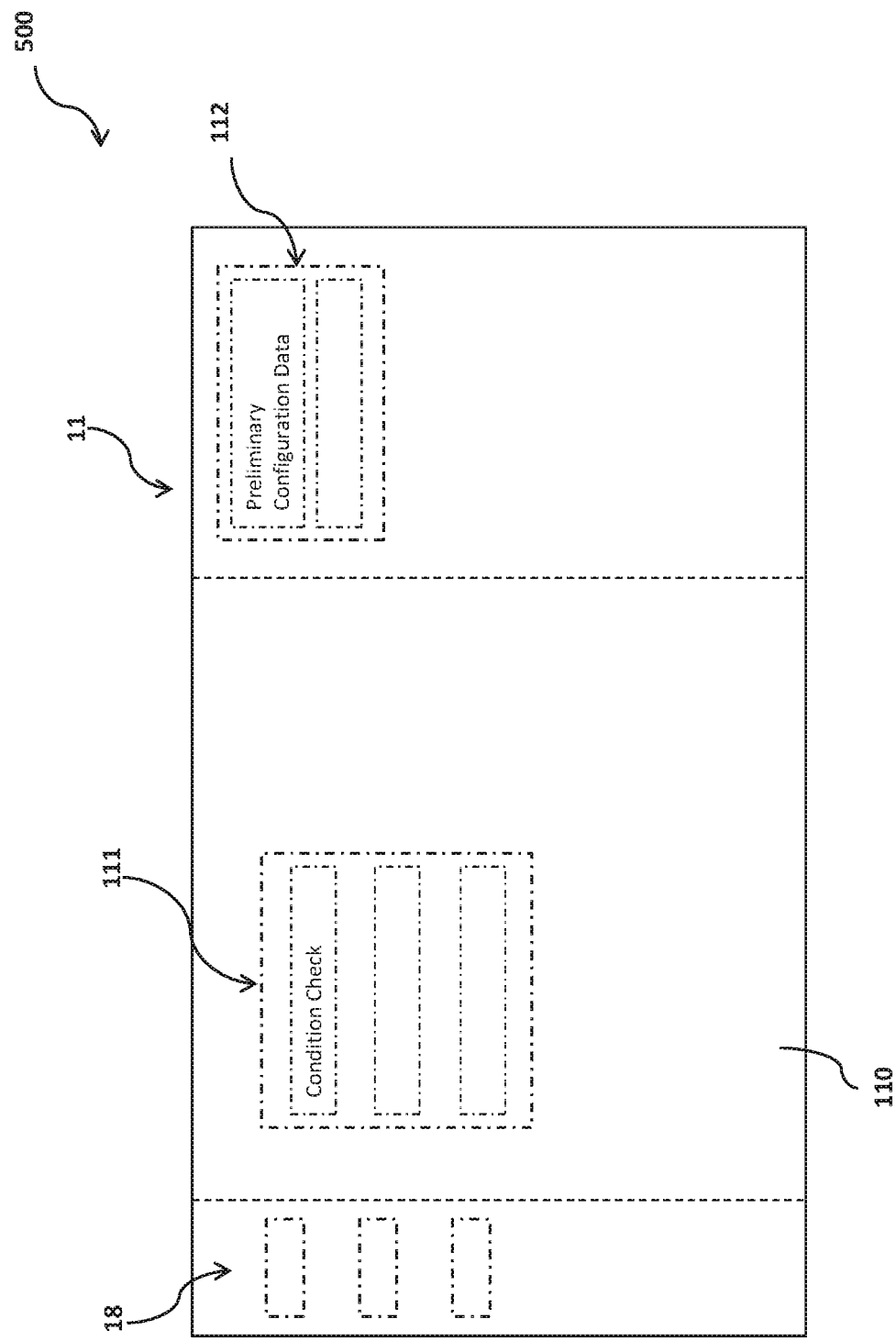

In a further step of the configuration method CFP, the computerised unit 50 provides first graphic resources 11 on the GUI 500 (preferably one or more dedicated configuration pages 110 thereof) to assist a user in checking whether there are some necessary operating conditions required for carrying out the configuration of one or more configurable accessory devices 1 (FIG. 6).

The first graphic resources 11 are aimed at assisting the user in checking and confirming that predefined operating conditions are met for the accessory device 1.

Preferably, the first graphic resources 11 comprises one or more graphic objects 111 (e.g. check lists or graphic sections or graphic pages to be fulfilled or ticked) to guide a user to check the connectivity conditions of one or more configurable accessory devices 1.

Conveniently, the graphic objects 111 may be arranged to assist a user in checking that the configurable accessory devices 1 and the electronic devices 21, 2A, 2B, 2C, 2D connected thereto are all physically connected in a LAN having an access to the Internet.

Conveniently, the graphic objects 111 may be arranged to assist a user in checking that the configurable accessory devices 1 are enabled to provide the grid data D collected from the electronic devices 21, 2A, 2B, 2C, 2D connected thereto.

Conveniently, the graphic objects 111 may be arranged to assist a user in checking a security access code is obtained from a configurable accessory device 1 of interest. Such a security access code can be obtained by a user by physically accessing to the configurable accessory device 1 of interest, e.g. interacting with the HMI of the protection relay to which said configurable accessory device is operatively associated.

Preferably, the first graphic resources 11 comprises one or more graphic objects 112 (e.g. a graphic mask) to assist a user in providing preliminary configuration data for the configurable accessory devices 1.

Conveniently, the graphic objects 112 may be arranged to assist a user in checking that all the configurable accessory devices 1 are tagged with an identification tag or provide other information such as time, date, and the like.

Figure 7:
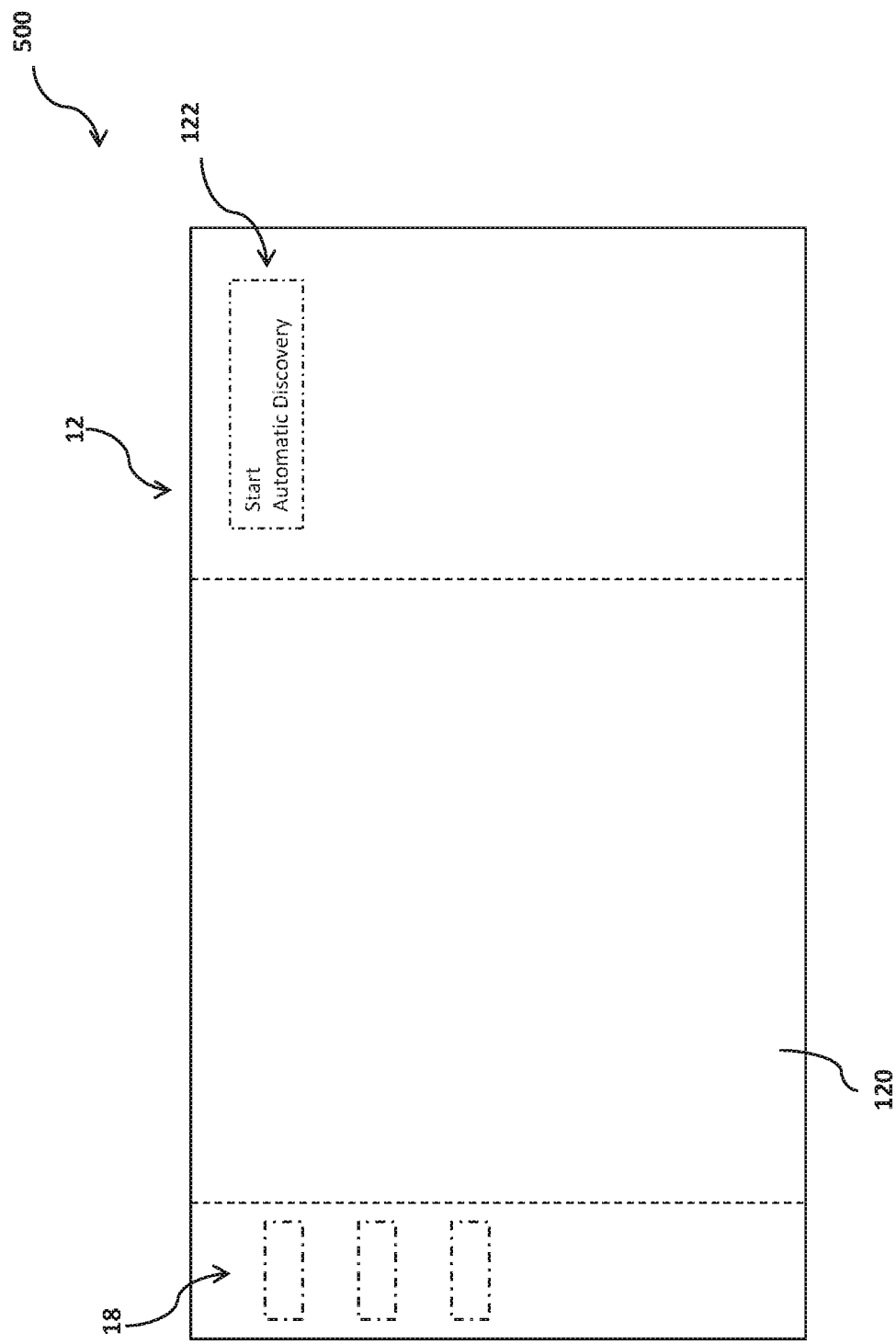
Figure 8:
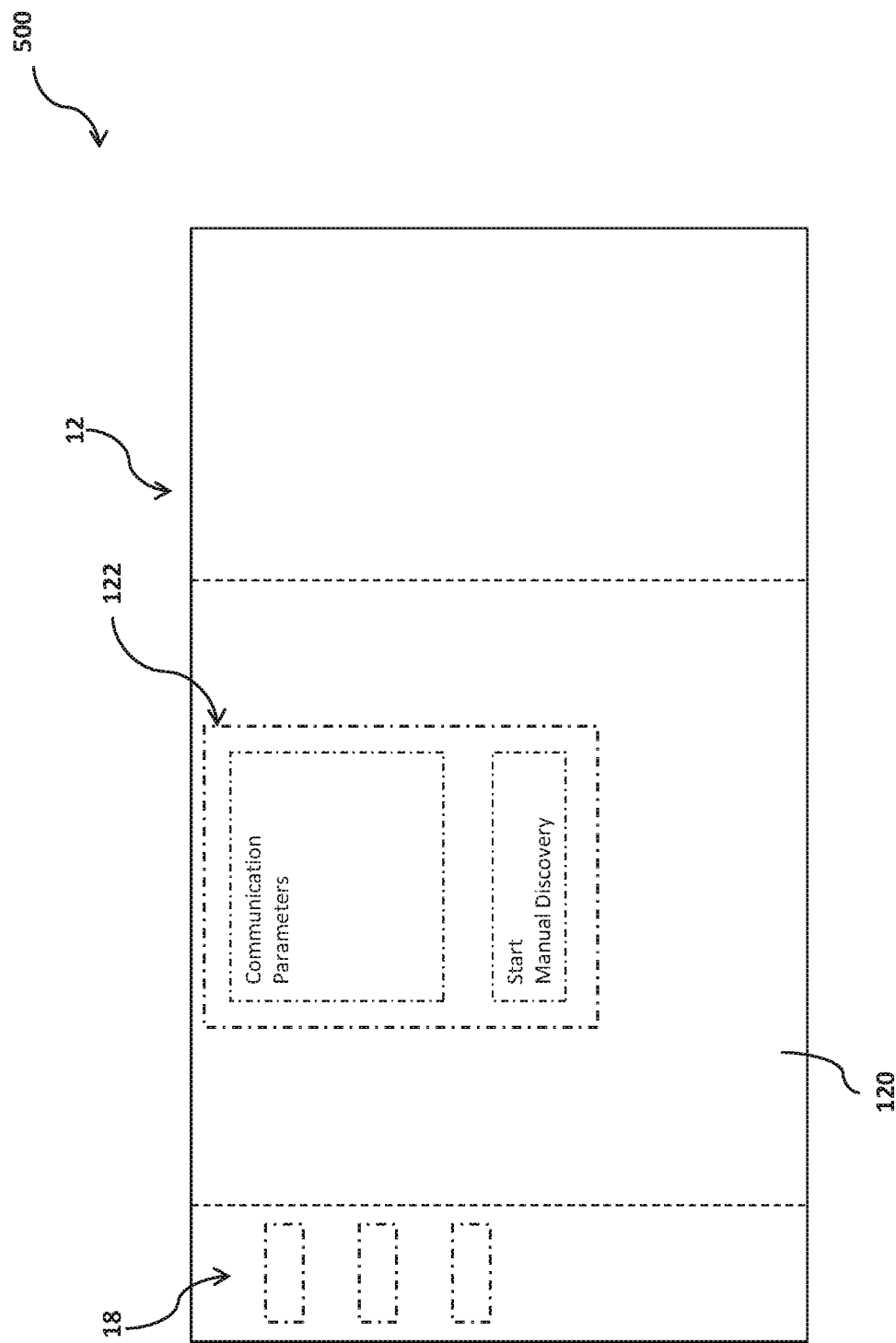

In a further step of the configuration method CFP, the computerised unit 50 provides second graphic resources 12 on the GUI 500 (preferably one or more dedicated configuration pages 120 thereof) to assist a user in launching a search to establish a communication link with the configurable accessory devices 1 (FIGS. 7, 8).

Preferably, the second graphic resources 12 comprise one or more graphic objects 121 (e.g. a start graphic button to activate to start with the search) to launch an automatic search (sniff search) to establish a communication link with the configurable accessory devices 1.

Conveniently, the graphic objects 121 allow a user to launch a search of the configurable accessory devices 1 through the Internet without the specification of addresses or other search parameters.

Preferably, the second graphic resources 12 comprise one or more graphic objects 122 to launch a manual search to establish a communication link with the configurable accessory devices 1. The graphic objects 122 may comprise a graphic mask to assist the user in providing given communication parameters (e.g. the IP addresses) related to the configurable accessory devices 1 and a start graphic button to activate to start with the search.

Conveniently, the graphic objects 122 allow a user to launch a search of the configurable accessory devices 1 through the Internet for a selected number of accessory devices only and/or for accessory devices that cannot be searched with an automatic search.

In a further step of the configuration method CFP, the computerised unit 50 executes a search to establish a communication link with the configurable accessory devices 1 in response to the activation of the second graphic resources 12.

In this step of the configuration method CFP, depending on the type of the second graphic resources 12 (graphic objects 121 or 122) that are activated by the user, the computerised unit 50 executes (through the Internet) an automatic search of possible configurable accessory devices 1 or executes a "manual" (more limited) search according to the information provided by the user by means of the graphic objects 122.

Figure 9:
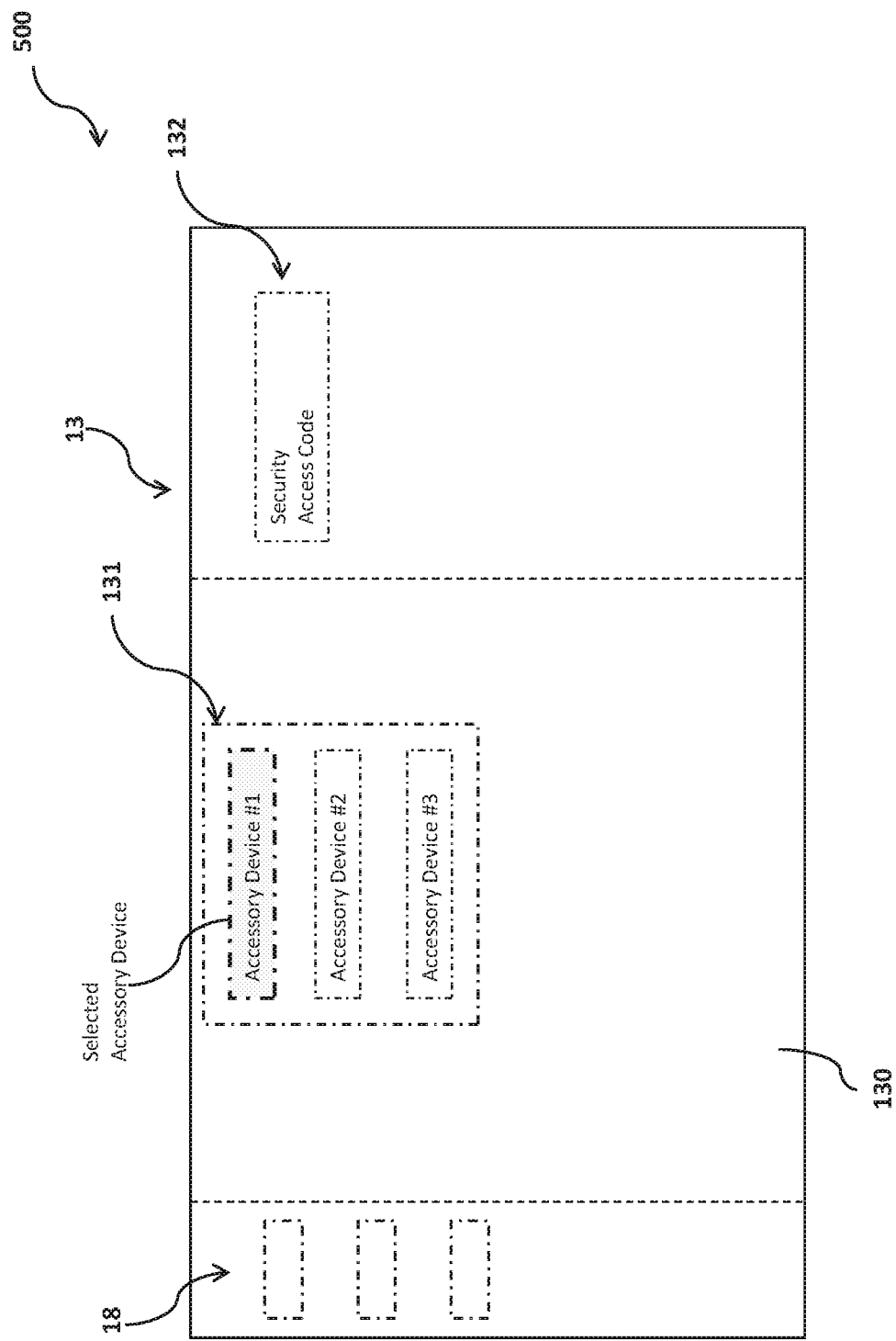

In a further step of the configuration method CFP, the computerised unit 50 provides third graphic resources 13 on the GUI 500 (preferably one or more dedicated configuration pages 130 thereof) to assist a user in selecting an accessory device 1 among the one or more configurable accessory devices, which have been searched and found at the previous configuration step, and in providing the security access code to access to a selected accessory device 1 of interest (FIG. 9).

Said security access code is stored in the accessory device 1 of interest and, as mentioned above, it can be obtained by a user by physically accessing to the configurable accessory device 1 of interest.

The inventors have found that this solution provides relevant advantages in terms of cyber security.

Preferably, the third graphic resources 13 comprise one or more graphic objects 131 (e.g. one or more graphic sections or graphic icons) to list the configurable accessory devices 1 in communication with the computerized unit 50.

Conveniently, the user can select a configurable accessory device 1 of interest (e.g. the accessory device AD1 of FIG. 9) in a list of configurable accessory devices.

By activating the corresponding graphic icon 131, selection commands are sent to the computerised unit 50 to open a stable communication channel with the selected accessory device.

Preferably, the third graphic resources 13 comprise one or more graphic objects 132 (e.g. a graphic mask) to provide said security access code in input to the computerised unit 50.

By providing a correct security access code, it is possible to access the selected configurable accessory device of interest.

In a further step of the configuration method CFP, the computerised unit 50 activates a communication channel with the selected accessory device 1 in response to the input of a correct security access code and on the base of the selection information provided by the user through the graphic objects 131.

In this way, the computerised unit 50 can exchange configuration data through the Internet with the selected accessory device 1.

Figure 10:
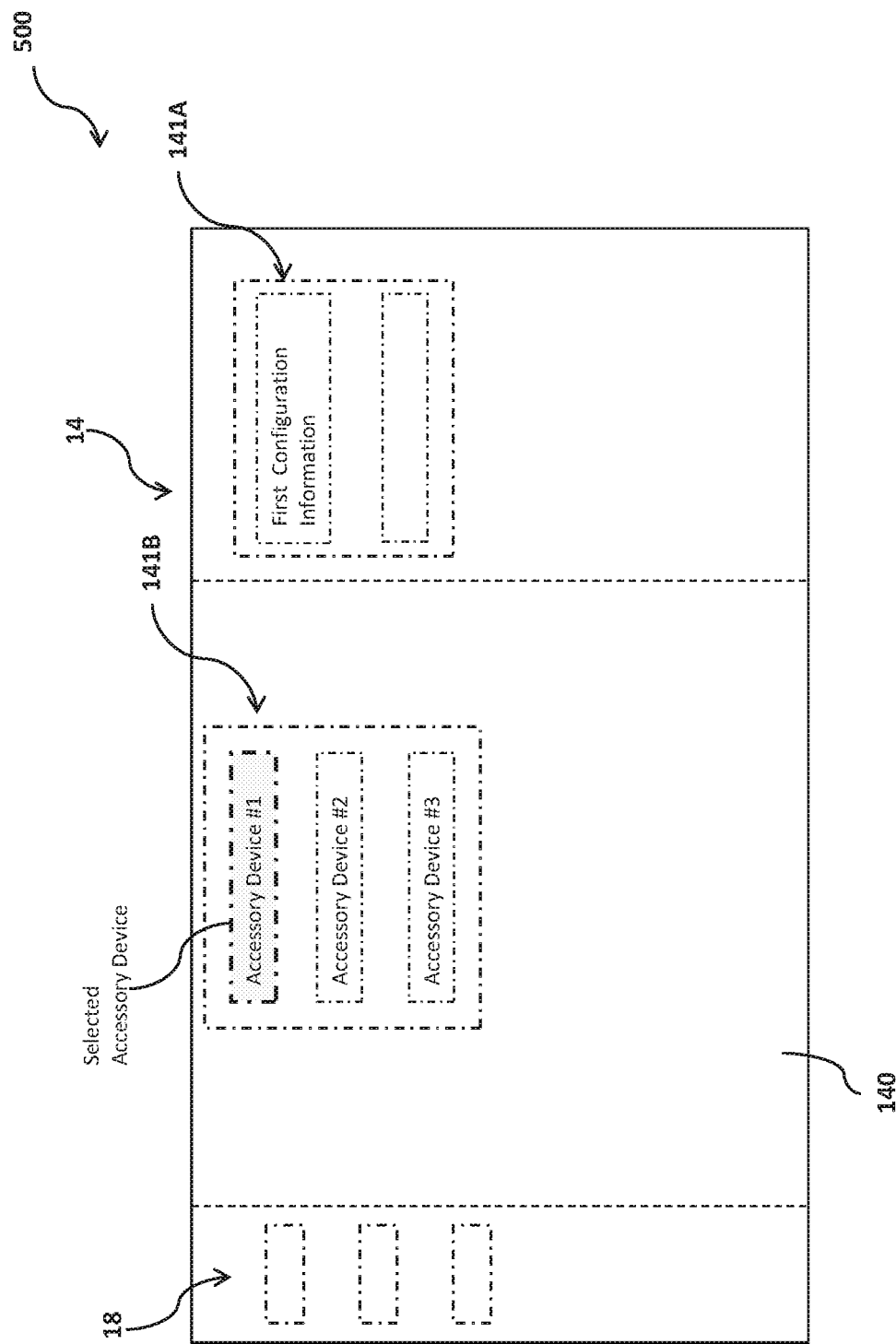

In a further step of the configuration method CFP, the computerised unit 50 provides fourth graphic resources 14 on the GUI 500 (preferably one or more dedicated configuration pages 140 thereof) to assist a user in providing first configuration information CF1 to configure the configurable accessory device 1 of interest, which has been selected in the previous step of the configuration method (FIG. 10).

Conveniently, the configuration information CF1 comprises one or more sets of configuration values directed to set-up the operation parameters of the selected accessory device 1.

The graphic resources 14 may comprise one or more graphic objects 141A (e.g. graphic masks and/or graphic cursors and/or graphic menus) to assist the user in providing the configuration information CF1.

The graphic resources 14 may comprise one or more graphic objects 141B (e.g. a graphic menu with activatable icons) to associate the configuration information CF1 to the selected accessory device 1.

Preferably, the configuration information CF1 is stored by the computerised unit 50 for being remotely transmitted to the computerised platform 340 and subsequently processed.

Figure 11:
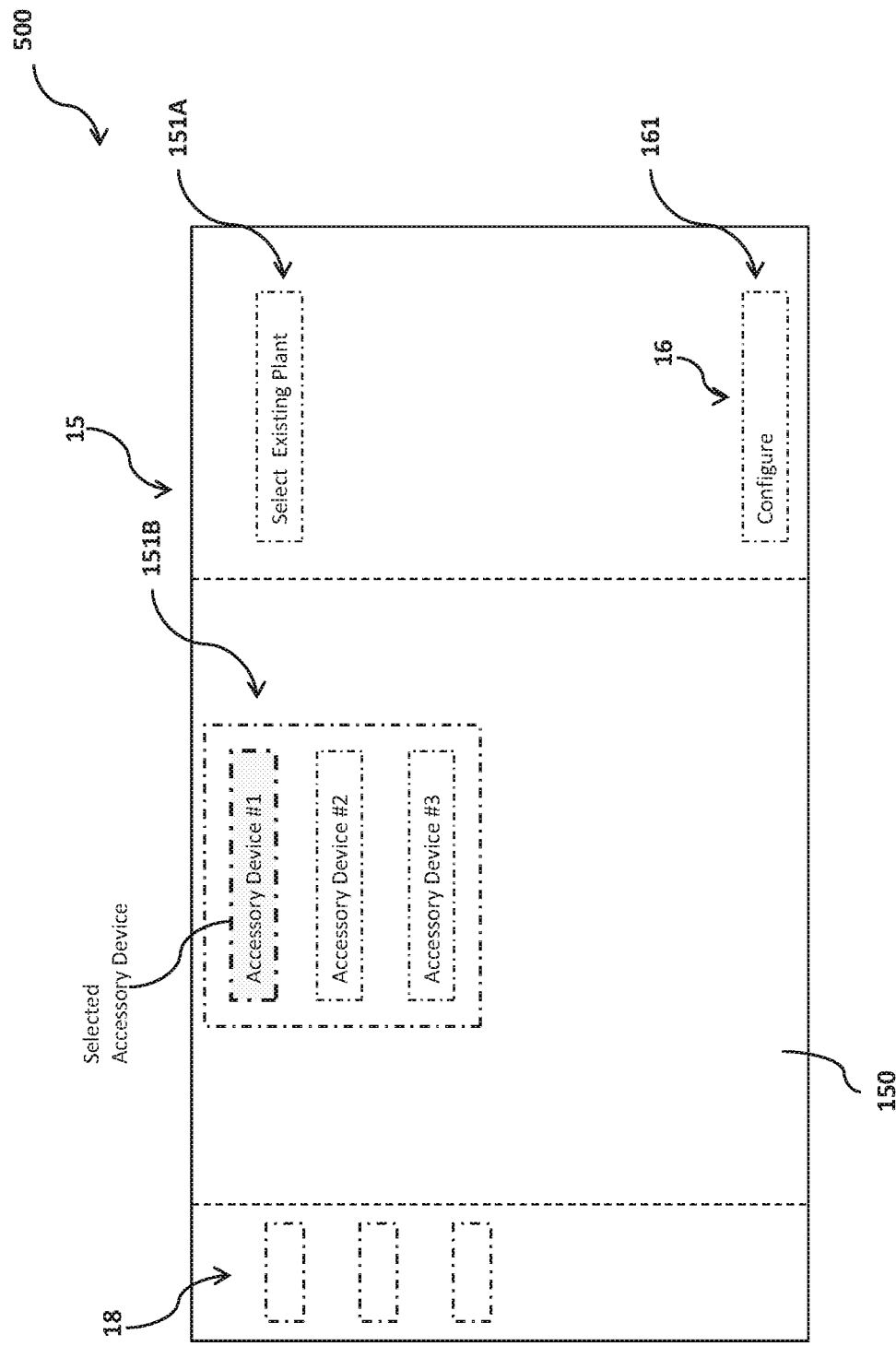
Figure 12:
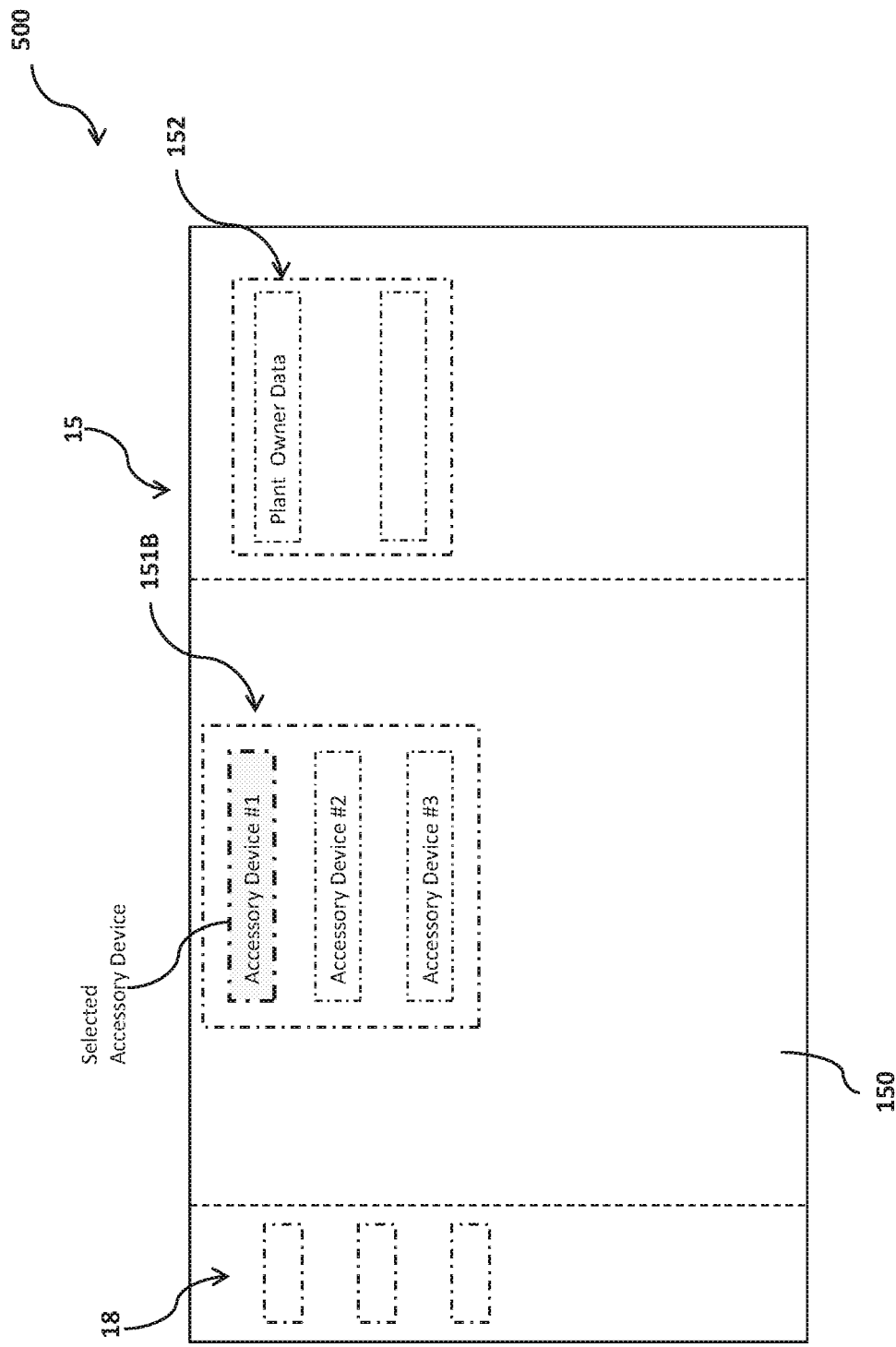
Figure 13:
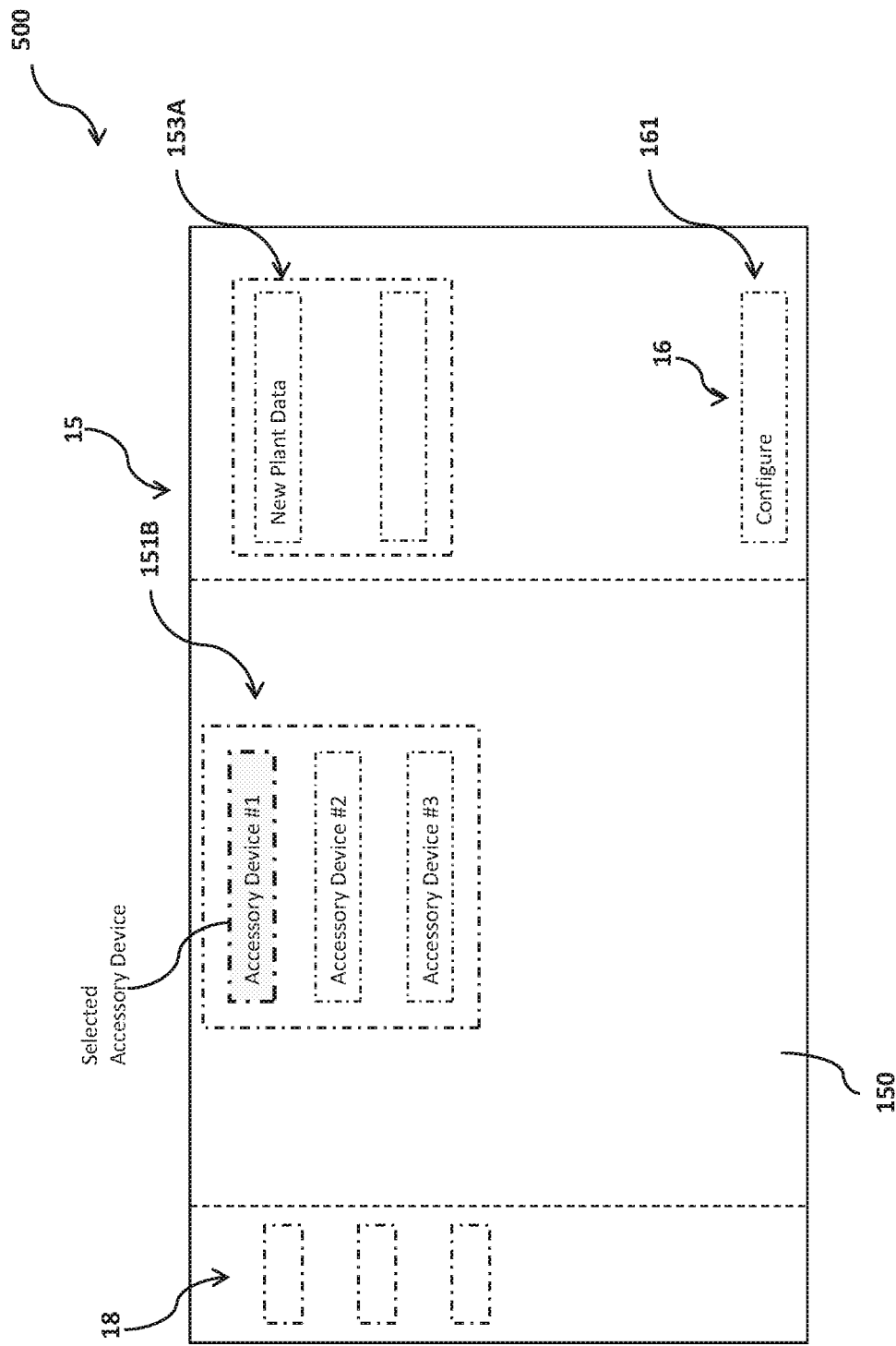

In a further step of the configuration method CFP, the computerised unit 50 provides fifth graphic resources 15 on the GUI 500 (preferably one or more dedicated configuration pages 150 thereof) to assist a user in providing second configuration information CF2 to associate the selected accessory device 1 to an electric plant (FIGS. 11, 12, 13).

Conveniently, the configuration information CF2 comprises linking information on how to associate the selected accessory device 1 to be configured to a corresponding electric plant. Preferably, the configuration information CF2 is stored by the computerised unit 50 for being remotely transmitted to the computerised platform 340 and for being subsequently processed. Preferably, the fifth graphic resources 15 comprise one or more graphic objects 151A, 151B (e.g. graphic icons and/or graphic menus) to associate the selected accessory device 1 to an existing electric plant.

Preferably, the information about the existing plants is stored by the computerised unit 50. Conveniently, the user can select an existing plant by means of a graphic menu 151A (thereby retrieving the corresponding sets of information) and can associate the selected accessory device 1 to said existing plant (more particularly to the corresponding sets of information) by simply activating, in a selective manner, a graphic icon 151B corresponding to said accessory device 1.

Preferably, the fifth graphic resources 15 comprise one or more graphic objects 152, 153A, 151B (e.g. graphic icons, graphic masks, graphic buttons and/or graphic menus) to associate the selected accessory device 1 to a new electric plant.

Preferably, the fifth graphic resources 15 comprise one or more graphic objects 152 (e.g. a graphic menu and a graphic button) to define an owner for said new plant electric.

Preferably, the fifth graphic resources 15 comprise one or more graphic objects 153A (e.g. a graphic mask) to assist a user to provide information about the new electric plant.

Preferably, the fifth graphic resources 15 comprise one or more graphic objects 151B (e.g. graphic icons and/or graphic menus) to associate the accessory device 1 to the new electric plant as defined by the user through the graphic objects 152.

Conveniently, the user can associate the selected accessory device 1 to said new plant (more particularly to the corresponding sets of information) by simply activating, in a selective manner, the graphic icon 151B corresponding to said accessory device 1.

In a further step of the configuration method CFP, the computerised unit 50 provides sixth graphic resources 16 on the GUI 500 to assist a user in launching a configuration process of the selected accessory device 1.

The graphic resources 16 may be provided in the one or more configuration pages 150 together with the graphic resources 15 (as shown in the FIGS. 11, 13) or in one or more dedicated configuration pages of the GUI 500.

Preferably, the graphic resources comprise one or more graphic objects 161 (e.g. graphic buttons) activatable by the user.

By activating the corresponding graphic icon 131, execution commands are sent to the computerised unit 50 to execute the mentioned configuration process of the selected accessory device 1.

In a further step of the configuration method CFP, the computerised unit 50 executes the configuration process of the selected accessory device 1 in response to the activation of the sixth graphic resources 16.

In a step of said configuration process, the computerised unit 50 generates a data-gathering file DGF and a data-publishing file DPF for the selected accessory device 1 based on the stored first and second configuration information CF1, CF2.

In a further step of said configuration process, the computerised unit 50 transmits the generated data-gathering file DGF and data-publishing file DPF to the selected accessory device.

In a further step of said configuration process, the computerised unit 50 transmits the first and second configuration information CF1, CF2 to the computerised platform 340.

The combination of steps of the configuration process described above is particularly advantageous as it allows properly configuring the selected accessory device 1 and, at the same time, to set-up the computerised platform 340 to properly communicate and interact with the selected accessory device 1.

Figure 14:
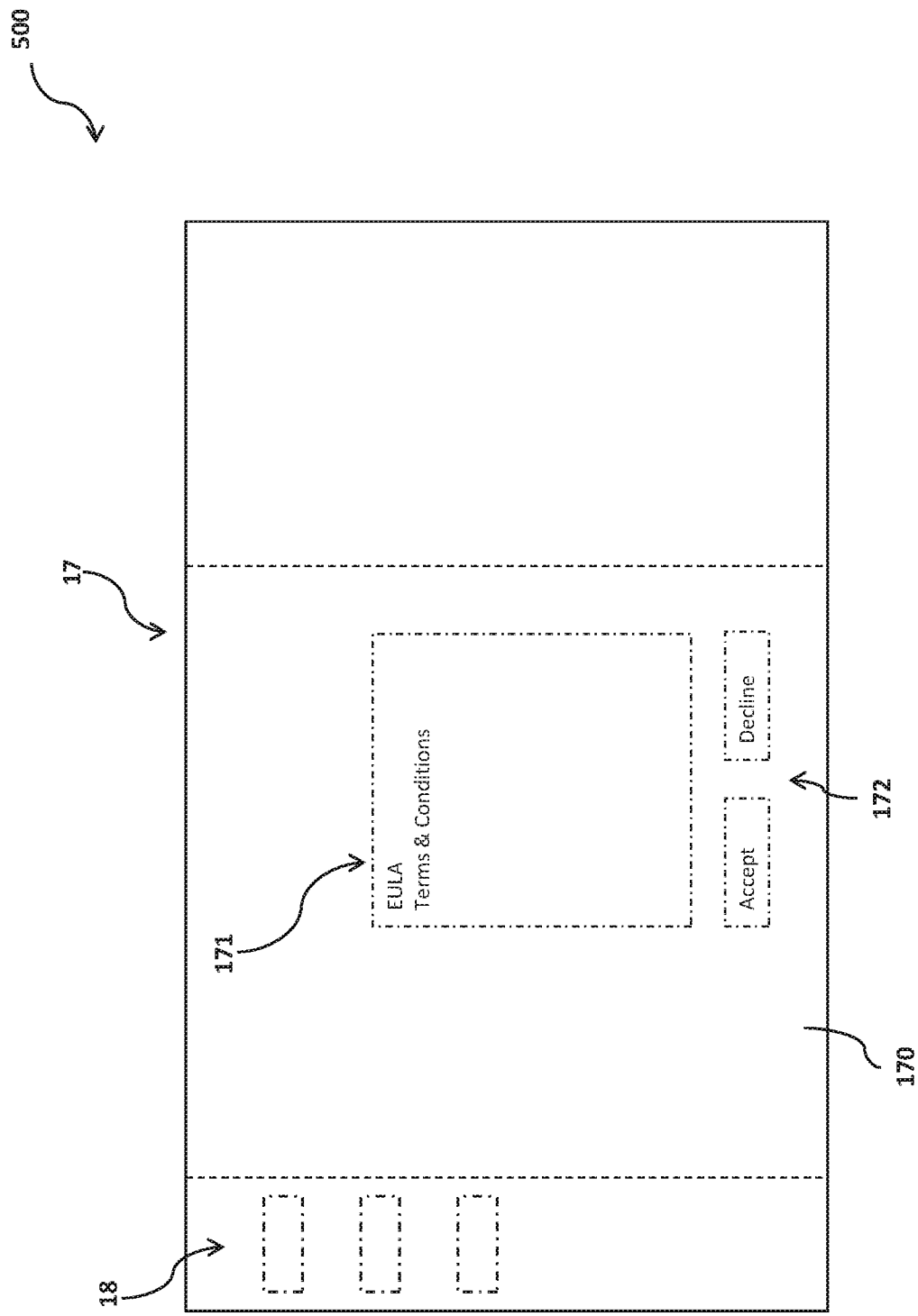

Preferably, in a further step of the configuration method CFP (FIG. 14), the computerised unit 50 provides seventh graphic resources 17 on the GUI 500 (e.g. one or more dedicated configuration pages 170 thereof) to assist a user in signing an EULA (End User License Agreement).

Preferably, the graphic resources comprise one or more graphic objects 171 (e.g. graphic section) reporting information on said EULA and one or more graphic objects 172 (e.g. graphic buttons) activatable by the user.

By activating the corresponding graphic buttons 172, execution commands are sent to the computerised unit 50 to store said signature information (accept or refuse).

In a further step of the configuration method CFP, the computerised unit 50 transmits the stored signature information to the computerised platform 340 in response to the activation of the graphic resources 17 (more particularly of the graphic objects 172).

In a further aspect, the present invention relates to a configuration method CFP for configuring at least an accessory device operatively coupled with or comprised in an electronic protection relay 2 of an electric power distribution grid 250.

The configuration method CFP comprises the following steps:

provide a graphic user interface (GUI) 500 on a computer display 52, said GUI including graphic resources 190, 11, 12, 13, 14, 15, 16, 17, 18 activatable by a user;

providing first graphic resources 11 on the GUI 500 to assist a user in checking whether there are given operating conditions required for carrying out the configuration of one or more configurable accessory devices;

providing second graphic resources 12 on the GUI 500 to assist a user in launching a search to establish a communication link with the configurable accessory devices 1;

performing a search through the Internet of the configurable accessory devices 1 in response to the activation of the second graphic resources 12;

providing third graphic resources 13 on the GUI 500 to assist a user in selecting an accessory device 1 among said one or more configurable accessory devices, which have been searched and found at the previous configuration step, and in providing a security access code to access to a selected accessory device, said security access code being manually obtainable from said selected accessory device;

activating a communication channel with the selected accessory device 1 in response to the input of said security access code;

providing fourth graphic resources 14 on the GUI 500 to assist a user in providing first configuration information CF1 to configure the selected accessory device 1;

providing fifth graphic resources 15 on the GUI 500 to assist a user in providing second configuration information CF2 to associate the selected accessory device 1 to an electric plant;

providing sixth graphic resources 16 on the GUI 500 to assist a user in launching a configuration process of the selected accessory device 1;

executing said configuration process in response to the activation of the sixth graphic resources 16, said configuration process comprising the following steps:

generating a data-gathering file DGF and a data-publishing file DPF for the selected accessory device 1 based on the first and second configuration information CF1, CF2;

transmitting the data-gathering file DGF and the data-publishing file DPF to the selected accessory device 1;

transmitting the first and second configuration information CF1, CF2 to the computerised platform 340.

Preferably, the configuration method CFP comprises the step of providing a login configuration page 190 on the GUI 500 to assist a user in providing login information to execute said configuration method.

Preferably, the configuration method CFP comprises the step of providing seventh graphic resources 17 on the GUI 500 to assist a user in signing an EULA.

In a further aspect, the present invention relates to a computer program, which is stored or storable in a storage medium and comprising software instructions configured to implement the configuration method CFP.

In a further aspect, the present invention relates to a configuration computerized unit 50 configured to execute software instructions to implement the configuration method CFP.

The computerised system 100 allows implementing a simple configuration method CFP to configure one or more accessory devices 1, which can thus may be easily installed (even on an already existing electronic protection relays 2) according to a "plug & play" mode, thereby being particularly adapted for retrofitting interventions to expand the functionalities of already existing electronic protection relays.

The configuration method CFP allows a user to carry out the configuration process of the accessory devices 1 in an assisted manner with simple steps that can be carried out also by personnel having small experience in modelling electric power distribution network.

The accessory devices 1 can be configured in a quick and efficient manner with a limited probability of errors and avoiding or reducing the need for cabling and programming activities.

The computerised system 100 is of easy and cheap realization at industrial level.

The invention claimed is:

1. A computerized system for managing an operation of an electric power distribution grid, comprising:
   at least an accessory device operatively coupled with or comprised in an electronic protection relay of said electric power distribution grid, wherein said at least an accessory device is configured to gather and transmit through an Internet grid data, which are related to the operation of said electric power distribution grid or one or more electronic devices of said electronic protection relay or operatively connected with said electronic protection relay, which are in communication with said at least an accessory device;
   a computerized platform capable of communicating and interact with said at least an accessory device through the Internet;
      a configuration computerized unit capable of communicating with said at least an accessory device and said computerized platform through the Internet, said configuration computerized unit being adapted to execute a configuration methodology of said at least an accessory device, comprising the following:
   provide a graphic user interface on a computer display, said graphic user interface including graphic resources activatable by a user;
   provide first graphic resources on said graphic user interface to assist a user in checking whether there are given operating conditions required for carrying out configuration of one or more configurable accessory devices;
   provide second graphic resources on said graphic user interface to assist a user in launching a search to establish a communication link with said one or more configurable accessory devices;
   perform a search through the Internet of said one or more configurable accessory devices in response to an activation of said second graphic resources;
   provide third graphic resources on said graphic user interface to assist a user in selecting an accessory device among said one or more configurable accessory devices and in providing a security access code to access to a selected accessory device, said security access code being obtainable by physically accessing to said selected accessory device;
   activate a communication channel with said selected accessory device in response to an input of said security access code;
   provide fourth graphic resources on said graphic user interface to assist a user in providing first configuration information to configure said selected accessory device;
   provide fifth graphic resources on said graphic user interface to assist a user in providing second configuration information to associate said selected accessory device to an electric plant;
   provide sixth graphic resources on said graphic user interface to assist a user in launching a configuration process of said selected accessory device;
   execute said configuration process in response to an activation of said sixth graphic resources, said configuration process comprising:
      generate a data-gathering file and a data-publishing file for said selected accessory device based on said first and second configuration information;
      transmit said data-gathering file and said data-publishing file to said selected accessory device;
      transmit said first and second configuration information to said computerized platform.

2. The computerized system, according to claim 1, wherein said first graphic resources comprise one or more graphic objects to assist a user in providing preliminary configuration data for said one or more configurable accessory devices.

3. The computerized system according to claim 1, wherein said first graphic resources comprises one or more graphic objects to guide a user to check connectivity conditions of said one or more configurable accessory devices.

4. The computerized system according to claim 1, wherein said second graphic resources comprise one or more graphic objects to launch an automatic search to establish a communication link with said one or more configurable accessory devices.

5. The computerized system according to claim 1, wherein said second graphic resources comprise one or more graphic objects to launch a manual search to establish a communication link with said one or more configurable accessory devices.

6. The computerized system according to claim 1, wherein said third graphic resources comprise one or more graphic objects to list said one or more configurable accessory device in communication with said configuration computerized unit.

7. The computerized system according to claim 1, wherein said third graphic resources comprise one or more graphic objects to input said security access code.

8. The computerized system according to claim 1, wherein said fifth graphic resources comprise one or more graphic objects to associate the selected accessory device to an existing electric plant.

9. The computerized system according to claim 1, wherein said fifth graphic resources comprise one or more graphic objects to associate the selected accessory device to a new electric plant.

10. The computerized system according to claim 1, wherein said configuration methodology comprises providing a login configuration page on said graphic user interface to assist a user in providing login information to execute said configuration method.

11. The computerized system according to claim 1, wherein said configuration methodology comprises providing seventh graphic resources on said graphic user interface to assist a user in signing an EULA.

12. A configuration method of at least an accessory device, said at least an accessory device being operatively coupled with or comprised in an electronic protection relay of an electric power distribution grid, wherein said at least an accessory device is configured to gather and transmit through an Internet grid data, which are related to an operation of said electric power distribution grid or of one or more electronic devices of said electronic protection relay or operatively connected with said electronic protection relay, which are in communication with said at least an accessory device, the method comprises;
  providing a graphic user interface on a computer display, said graphic user interface including graphic resources activatable by a user;
  providing first graphic resources on said graphic user interface to assist a user in checking whether there are given operating conditions required for carrying out configuration of one or more configurable accessory devices;
  providing second graphic resources on said graphic user interface to assist a user in launching a search to establish a communication link with said one or more configurable accessory devices;
  performing a search through the Internet of said one or more configurable accessory devices in response to an activation of said second graphic resources;
  providing third graphic resources on said graphic user interface to assist a user in selecting an accessory device among said one or more configurable accessory devices and in providing a security access code to access to a selected accessory device, said security access code being manually obtainable from said selected accessory device;
  activating a communication link with said selected accessory device in response to an input of said security access code;
  providing fourth graphic resources on said graphic user interface to assist a user in providing first configuration information to configure said selected accessory device;
  providing fifth graphic resources on said graphic user interface to assist a user in providing second configuration information to associate said selected accessory device to an electric plant;
  providing sixth graphic resources on said graphic user interface to assist a user in launching a configuration process of said selected accessory device;
  executing said configuration process in response to an activation of said sixth graphic resources, said configuration process comprising the following steps:
    generating a data-gathering file and a data-publishing file for said selected accessory device based on said first and second configuration information;
    transmitting said data-gathering file and said data-publishing file to said selected accessory device;
    transmitting said first and second configuration information to a computerized platform capable of communicating and interact with said at least an accessory device through the Internet.

13. A non-transitory computer readable storage medium readable by a processing unit comprising:
  instructions stored on the non-transitory computer readable storage medium and executable by the processing unit effective to:
  operate an electric power distribution grid including at least an accessory device operatively coupled with or comprised in an electronic protection relay of said electric power distribution grid, wherein said at least an accessory device is configured to gather and transmit through an Internet grid data, which are related to an operation of said electric power distribution grid or one or more electronic devices of said electronic protection relay or operatively connected with said electronic protection relay, which are in communication with said at least an accessory device;
  operate a computerized platform capable of communicating and interact with said at least an accessory device through the Internet; and
  operate a configuration computerized unit capable of communicating with said at least an accessory device and said computerized platform through the Internet, said configuration computerized unit being adapted to execute a configuration of said at least an accessory device, said configuration comprising the following steps:
    providing a graphic user interface on a computer display, said graphic user interface including graphic resources activatable by a user;
    providing first graphic resources on said graphic user interface to assist a user in checking whether there are given operating conditions required for carrying out configuration of one or more configurable accessory devices,
    providing second graphic resources on said graphic user interface to assist a user in launching a search to establish a communication link with said one or more configurable accessory devices,
    performing a search through the Internet of said one or more configurable accessory devices in response to an activation of said second graphic resources,
    providing third graphic resources on said graphic user interface to assist a user in selecting an accessory device among said one or more configurable accessory devices and in providing a security access code to access to a selected accessory device, said security access code being obtainable by physically accessing to said selected accessory device,
    activating a communication channel with said selected accessory device in response to an input of said security access code,
    providing fourth graphic resources on said graphic user interface to assist a user in providing first configuration information to configure said selected accessory device,
    providing fifth graphic resources on said graphic user interface to assist a user in providing second configuration information to associate said selected accessory device to an electric plant,
    providing sixth graphic resources on said graphic user interface to assist a user in launching a configuration process of said selected accessory device, and
    executing said configuration process in response to an activation of said sixth graphic resources, said configuration process comprising the following steps:
      generating a data-gathering file and a data-publishing file for said selected accessory device based on said first and second configuration information,
      transmitting said data-gathering file and said data-publishing file to said selected accessory device, and
      transmitting said first and second configuration information to said computerized platform.

* * * * *